United States Patent [19]

D'Alessandro

[11] Patent Number: 5,515,641

[45] Date of Patent: May 14, 1996

[54] TANGLE-AVOIDING, QUICK-USE, FISHING POLE SHEATH

[76] Inventor: David A. D'Alessandro, 5 Franklin St., Manchester, Conn. 06040

[21] Appl. No.: 433,175

[22] Filed: May 3, 1995

Related U.S. Application Data

[63] Continuation-in-part of Ser. No. 300,989, Sep. 6, 1994, abandoned.

[51] Int. Cl.[6] .................................................. A01K 97/08
[52] U.S. Cl. .......................... 43/26; 206/315.11; D3/260
[58] Field of Search ................................ 43/26, 21.2, 54.1, 43/4.5; 206/315.11; 224/922; D3/260, 262, 261; 150/154, 900

[56] References Cited

U.S. PATENT DOCUMENTS

| | | | |
|---|---|---|---|
| D. 268,547 | 4/1983 | Ruckstuhl | D3/260 |
| D. 294,883 | 3/1988 | McMillian | D3/260 |
| 764,398 | 7/1904 | Upton | 43/26 |
| 3,624,948 | 12/1971 | De Baker, Sr. | 43/26 |
| 4,136,478 | 1/1979 | Wycosky | 43/26 |
| 4,222,193 | 9/1980 | Beck | 206/315.11 X |
| 4,530,178 | 7/1985 | Rauscher | 43/54.1 X |
| 4,916,852 | 4/1990 | Zebleckis | 43/54.1 X |
| 5,277,306 | 1/1994 | Sargent | 206/315.11 |
| 5,327,669 | 7/1994 | Lannan et al. | 206/315.11 X |
| 5,417,354 | 5/1995 | Jones | 224/922 X |

OTHER PUBLICATIONS

Dan Bailey's Fly Shop, 1990, "D.B. Dun Rod Cases", p. 56.

*Primary Examiner*—Jack W. Lavinder
*Assistant Examiner*—Jeanne M. Elpel
*Attorney, Agent, or Firm*—M. P. Williams

[57] ABSTRACT

A fishing pole casing consists of a tubular sheath of plain or canvas backed, smooth, solid plastic sheeting with a longitudinal, stitched or welded seam, and an elastic loop; only the portion of the rod ahead of the reel is inserted into the sheath and the elastic loop engages the reel of the pole to urge the rod into the sheath.

3 Claims, 1 Drawing Sheet

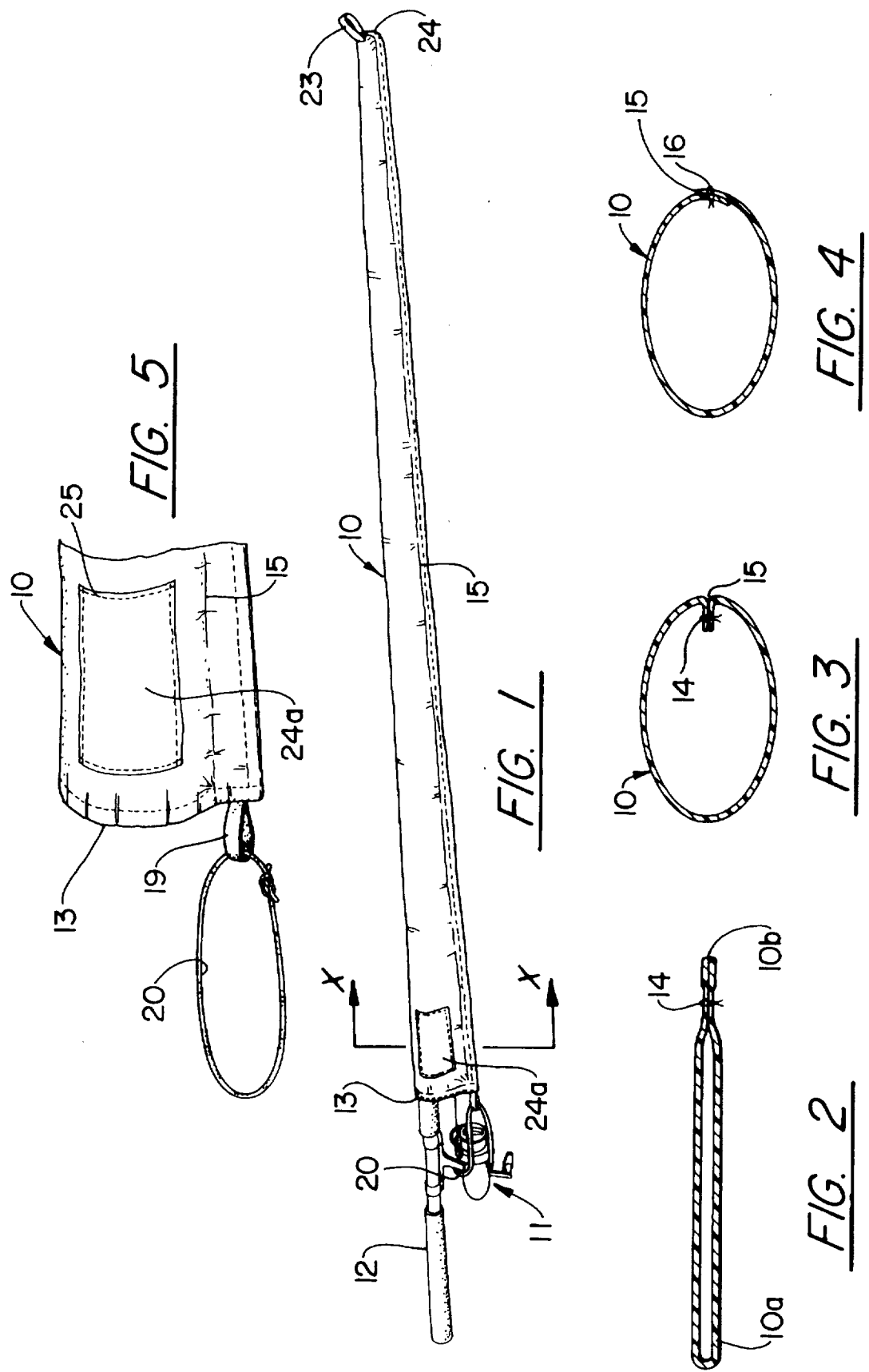

1

TANGLE-AVOIDING, QUICK-USE, FISHING POLE SHEATH

This is a continuation-in-part of application Ser. No. 08/300,989, filed Sep. 6, 1994, now abandoned.

TECHNICAL FIELD

This invention relates to a fishing pole sheath which will support competitive sport fishermen in the use of multiple, ready-to-go fishing poles in tournaments and the like.

BACKGROUND ART

In competitive sport fishing, such as the ever-popular bass tournaments, it is common for two or more anglers to compete from a single boat, each accompanied by five or ten ready-to-use fishing poles. As is known, the need to avoid having gear adrift in the boat typically results in the poles being stowed in a long pole locker, in which there is significant likelihood that the snap leaders, lures, hooks, eyelets and line of one pole will entangle those of another pole. Although this problem has been recognized, and solutions therefor alleged to have been provided (such as in U.S. Pat. Nos. 2,723,482; 3,972,144; 4,530,178; and 5,277,306), there still is not a widely-accepted fishing rod sleeve which satisfies the needs of anglers that desire to quickly switch the pole in use during competition.

There are a number of reasons to explain why prior fishing rod casing proposals have not satisfied this particular need. Almost all of the fishing rod cases have been designed as protective cases for shipping, carrying, and storage, rather than for preventing entanglement while in a rapid-use situation.

Some of the prior cases are specifically designed for use with rods which are broken down into three or more pieces, such as U.S. Pat. Nos. 679,442; 764,398; and 3,131,503. These, of course, are useless during competitive fishing.

Others are designed to completely enclose an assembled fishing rod/reel combination, which may be rigged and ready to use, with flaps and draw strings (U.S. Pat. No. 3,972,144) or Velcro (U.S. Pat. Nos. 4,530,178; 5,277,306), with a zippered pouch (U.S. Pat. No. 2,723,482) or with a reel box having a closure lid (U.S. Pat. No. 5,046,279). Closing and unclosing these is antagonistic to the purpose of quickly switching rods during competition. If the closures were left open, they would unduly aggravate the entanglement of one rod and its open case with another rod having an open case, in an obvious way. Since protection of the rod and reel and coverage of the reel are wholly unnecessary in fishing competition, the loss of the desired characteristics of speed in use and lack of entanglement is unwarranted.

Some of the prior cases are made of conformable, expandable mesh, the shape of which conforms to the rod and its protuberances, as in U.S. Pat. Nos. 4,222,193 and 4,916,852. This makes it very hard to get the rod into the case, and more particularly, to extract the rod from the case, quickly, during the excitement of competition. Additionally, the use of mesh promotes entanglement between the case and the rod's own rigging, as well as with the rigging on adjacent rods. This fact is brought out in U.S. Pat. No. 5,277,306 wherein an auxiliary purse is utilized to encase the hook of a pole prior to insertion of the pole into a mesh case.

Many of the prior cases have various accessories that constitute protrusions and protuberances which enhance the opportunity for entanglement, among other like protuberances and protrusions, or with other rigging. For instance, the cases of U.S. Pat. Nos. 4,222,193 and 5,277,306 have rings at their tip ends with which the protrusions of an adjacent pole could entangle. U.S. Pat. Nos. 4,530,178 and 5,277,306 suggest a carrying handle, midway along the case; this clearly could result in entanglement. And, the case of U.S. Pat. No. 5,293,711 has all sorts of accessories hanging all over it, all of which contribute to the likelihood of entanglement.

DISCLOSURE OF INVENTION

Objects of the invention include provision of a fishing pole casing which absolutely minimizes the opportunity for entanglement amongst a plurality of similarly-encased fishing poles in a fishing pole locker of a boat; and which supports an angler competing in a fishing tournament and his need to be able to rapidly exchange poles, maintain unusable poles safely stowed in an untangled state, and quickly extract and insert the poles from the casing.

As used herein, a fishing pole includes a reel mounted on a rod; the shaft portion of the pole is defined as the portion of the rod which extends from the distal, tip end of the rod to the reel, with eyelets, line and possibly a handle grip (if mounted ahead of the reel).

In accordance with the invention, a tangle-avoiding, quick, fishing pole sheath comprises a tubular sheath, which may be tapered, formed of substantially smooth, soft, pliable medium weight, solid plastic which is totally unencumbered with features and/or accessories.

According to the present invention, a non-tangling, quick, fishing pole sheath consists essentially of a tapered tubular sheath of substantially smooth, soft, pliable medium weight solid plastic sheathing, such as vinyl, of a sufficient length to cover the shaft from the tip (distal end) thereof to the reel (proximal end) thereof, an elastic loop, and means for attaching the elastic loop to the proximal end of the sleeve so that the loop may engage the reel disposed on the rod and thereby resiliently urge the rod into the sheath, thereby to hold the sheath on the rod. According further to the invention, the sleeve may be formed of plastic sheeting having a canvas backing. According to the invention still further, the sheath may, but need not, have a loop, suitable for hanging the rod encased in the sheath for storage when not in use, such as during the off-season. The invention preferably (but need not) incorporates a clear label pocket within which the identity of the related rod may be placed.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a side elevation view of a sheath according to the invention disposed on a fishing pole.

FIG. 2 is a simplified sectional end elevation view of a straight stitch joining the edges of a folded sheet of suitable material to form the embodiment of FIG. 3.

FIG. 3 is a simplified sectional end elevation view of a first embodiment of the invention, taken on the line X,X in FIG. 1.

FIG. 4 is a simplified sectional end elevation view of a second embodiment of the invention, taken on the line X,X in FIG. 1.

FIG. 5 is an enlarged, detailed view of the proximal end of the sleeve illustrating the elastic loop and label pocket disposed thereon.

BEST MODE FOR CARRYING OUT THE INVENTION

Referring now to FIG. 1, the sheath 10 of the present invention is shown with the shaft portion of a fishing pole therein, the reel 11 and handle 12 of which are extending outwardly from the proximal end 13 of the sleeve 10. As seen in FIG. 2, the sleeve may be formed by folding a piece of substantially smooth, soft, pliable, solid, medium weight plastic material 10a, such as vinyl, fastening the longitudinal edges 10b of the material together with an elongated straight stitch 14 to form a relatively flat sleeve, and thereafter turning the sleeve inside out as seen in FIG. 3 so as to provide a smooth seam 15 along the length thereof. Alternatively, the sleeve may be made rightside out using a french stitch 16 as shown in FIG. 4, or by using a french stitch. Or, the seam 15 may be formed in a similar fashion without stitches, by bonding portions of the material in any suitable way, such as with adhesive or by heat or chemical welding of the material. In forming the seam 15, a small loop of material 19 (FIG. 4) may be captured within the seam at the proximal end 13 of the sheath 10 to permit attaching an elastic loop 20 to the sheath 10. Alternatively, the elastic loop 20 could be disposed directly within the seam 15 and captured by the stitching 14, 16 or the alternative bonding. Or, a grommet or suitable staple could be used as the means for attaching the elastic loop 20 to the proximal end 13 of the sheath 10. The loop 20 fits over some part of the reel 11, which will depend on the nature of the reel, the exact length of the sheath 10 compared with the overall length of the shaft portion of the fishing pole encased therein, and the preferences of the user.

A small loop tab 23 of fabric may be formed in the distal end 24 of the sheath 10 so as to facilitate turning it right side out during manufacture (in the case of the embodiment of FIGS. 1 and 2) and/or to permit hanging the rod for storage when not in use, such as during the off-season. However, the loop 23 need not be provided (and/or may be removed) if not needed or desired.

A clear plastic label pocket 24a may be formed on the outside surface of the sheath 10, near its proximal end 13, to receive information identifying the particular fishing pole with which the sleeve has been associated for use. This may be stitched (as at 25) or bonded in place.

The sheath 10 may be of any suitable length, typically between fifty inches and sixty-six inches long. The large diameter, proximal end 13 may have a circumference of on the order of between five inches and seven inches, and the small diameter, distal end may have a circumference on the order of about three inches. The sheath 10 may be untapered for about twenty inches from the open, proximal end 13, if desired. Though not preferred, the sheath 10 could be made of cylindrical plastic tubing, such as "endless" extruded tubing; however, the tapered shape is preferred. The shape and size of each sheath 10 can be selected so as to suit the type of pole, particularly its length and the size of its eyelets, which is to be accommodated within the sheath 10.

In shaping and sewing or bonding the sheet material or tubing, the distal end 24 should be made to be somewhat rounded, as shown in FIG. 1, so as to facilitate inserting a sheathed pole into a locker full of poles.

The material of the sleeve 10 is preferably canvas backed, medium weight vinyl sheeting, of the type commonly used in automobile upholstery. By canvas is meant a rough fabric, which may preferably comprise plastic. The weight of the plastic material of which the sleeve 10 is formed should be just sufficient so as to provide a smooth bridge over the eyelets of the pole, rather than allowing the eyelets to cause protrusions in the sleeve 10 which could increase the opportunity for entanglement between similarly-encased adjacent fishing poles.

An important characteristic of the invention is that the sheath 10 be a tubular sheath, defined herein as being as shown in FIGS. 3 and 4 and formed from sheeting by turning a sleeve formed by a straight stitch inside out or by use of a flat feld or french stitch (or equivalent bonding), or formed from cylindrical tubing; in contrast with a flat sleeve formed by a straight stitch and not turned inside out (as in FIG. 2). This results in an open sheath into which (and out of which) a shaft portion of a pole can easily be quickly slid.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. In the method of storing and using a plurality of fully rigged fishing poles, each comprising a rod, a reel and fishing line thereon, in a competitive fishing tournament, comprising the steps of:

storing each pole when not in use by quickly sliding a rod portion, exclusive of the reel, of each of said fishing poles into a tubular sheath having a closed, rounded, distal end and an open, proximal end through which the rod portion may be easily slid into the sheath, said sheath formed of solid, substantially smooth, soft, pliable, medium weight plastic, and securing said sheath to the reel of the related fishing pole by means of an elastic loop; and retrieving any of said poles selected for use by releasing said elastic loop from said related reel and quickly sliding said rod portion from said sheath.

2. A tangle-avoiding, quick-use casing for a fishing pole having a tip, a reel, and a shaft portion extending from said reel to said tip, consisting essentially of a tubular sheath of substantially smooth, soft, pliable medium weight, solid plastic material having an open end and a rounded, closed end and being of a length substantially that of the shaft portion of a fishing pole which is to be encased thereby, said sheath being tapered along a portion of its length contiguous with said closed end, and an elastic loop secured to the open end of said sheath for engaging the reel of a fishing pole, thereby to resiliently urge said shaft portion into said sheath.

3. A tangle-avoiding, quick-use casing for a fishing pole having a tip, a reel, and a shaft portion extending from said reel to said tip, consisting essentially of a tubular sheath of substantially smooth, soft, pliable canvas backed, medium weight, solid plastic material having an open end and a rounded, closed end and being of a length substantially that of the shaft portion of a fishing pole which is to be encased thereby, said sheath being tapered along a portion of its length contiguous with said closed end, and an elastic loop secured to the open end of said sheath for engaging the reel of a fishing pole, thereby to resiliently urge said shaft portion into said sheath.

* * * * *